US006983831B2

(12) United States Patent
Beri

(10) Patent No.: US 6,983,831 B2
(45) Date of Patent: Jan. 10, 2006

(54) BRAKE SHOE AND BRAKE LINING BLOCKS WITH KEYED CONNECTION

(75) Inventor: Michael Beri, North York (CA)

(73) Assignee: C.M. Brake Inc., Toronto (CA)

( * ) Notice: Subject to any disclaimer, the term of this patent is extended or adjusted under 35 U.S.C. 154(b) by 0 days.

(21) Appl. No.: 10/684,877

(22) Filed: Oct. 13, 2003

(65) Prior Publication Data

US 2005/0077127 A1 Apr. 14, 2005

(51) Int. Cl.
F16D 69/00 (2006.01)
(52) U.S. Cl. .............................. 188/250 B; 188/250 G
(58) Field of Classification Search ............ 188/250 B, 188/250 D, 250 G
See application file for complete search history.

(56) References Cited

U.S. PATENT DOCUMENTS

| 1,781,074 | A |   | 11/1930 | Norton |
| 1,937,140 | A |   | 11/1933 | Blume |
| 2,067,677 | A |   | 1/1937 | Murphy |
| 2,541,978 | A | * | 2/1951 | Amundsen ............... 192/107 T |
| 2,879,866 | A | * | 3/1959 | Newell ........................ 188/234 |
| 3,467,229 | A | * | 9/1969 | Deibel ........................ 188/245 |
| 3,891,069 | A |   | 6/1975 | Lawrence |
| 4,501,347 | A | * | 2/1985 | Cerny et al. ............ 188/250 G |
| 4,569,424 | A |   | 2/1986 | Taylor, Jr. |
| 4,588,050 | A |   | 5/1986 | Urban |
| 4,771,870 | A |   | 9/1988 | Belk |
| 5,139,114 | A |   | 8/1992 | Rodriguez et al. |
| 5,255,762 | A |   | 10/1993 | Beri |
| 5,839,550 | A | * | 11/1998 | Redgrave et al. ....... 188/250 D |
| 6,520,301 | B2 | * | 2/2003 | Young .................... 188/250 G |
| 2002/0121412 | A1 |   | 9/2002 | Young |

FOREIGN PATENT DOCUMENTS

CA 948130 5/1974
GB 2 073 834 A 10/1981

OTHER PUBLICATIONS

Brakepro™ Heavy Duty Presents . . . The INTEGRA-BLOK® Advantage, pp. 1-8.

* cited by examiner

Primary Examiner—Chris Schwartz
(74) Attorney, Agent, or Firm—Brooks Kushman P.C.

(57) ABSTRACT

A brake shoe assembly comprising a brake shoe to which brake plates are assembled. The brake shoe has a key that extends outwardly from an outer radial surface of the brake shoe. The key is received in a slot formed in a backing plate of the brake plate. Preassembled rivets are provided on the brake plates to facilitate alignment of the brake plates with the brake shoe so that the key is received in the slot. Rivets are provided in four open corner areas so that the brake plate may be secured to the brake shoe with metal-to-metal contact where the brake plate is riveted to the brake shoe.

10 Claims, 2 Drawing Sheets

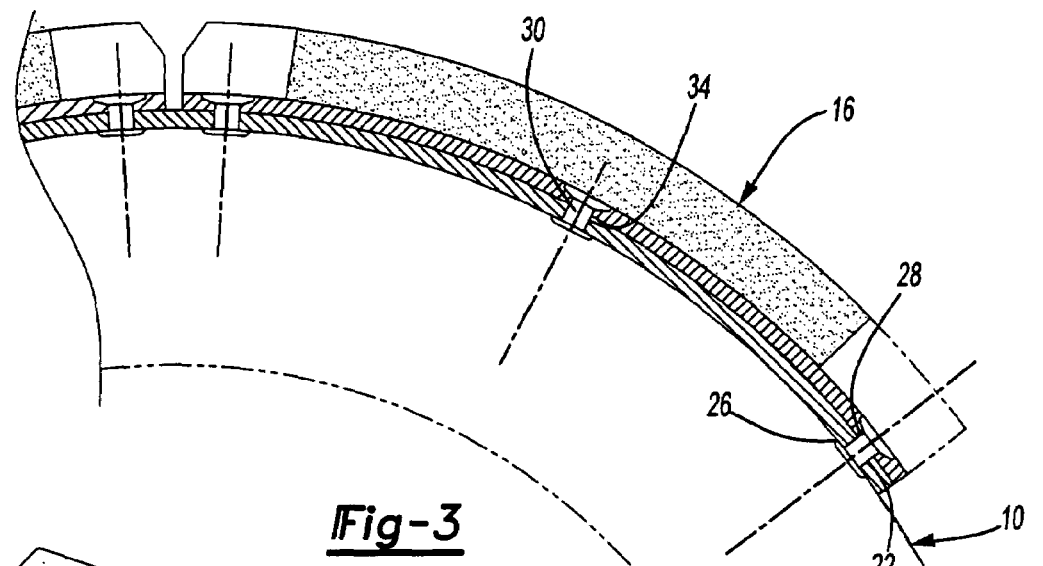
Fig-3
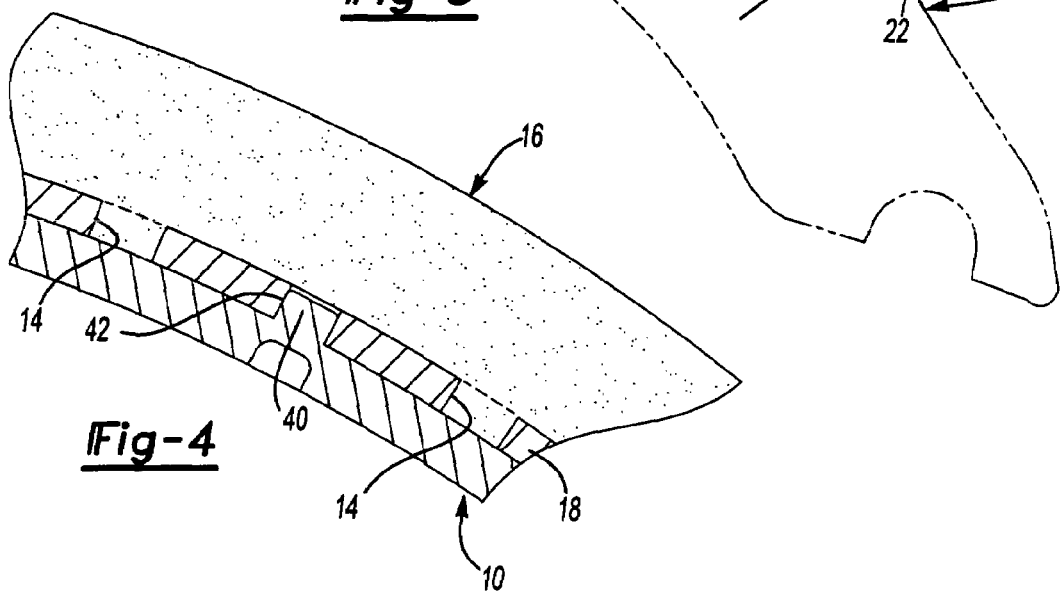
Fig-4
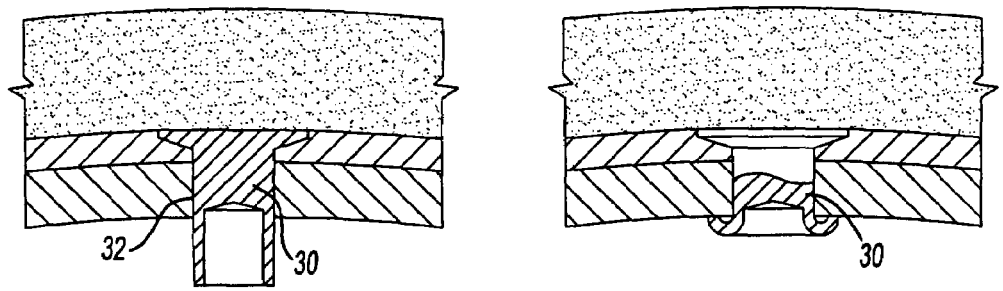
Fig-5
Fig-6

BRAKE SHOE AND BRAKE LINING BLOCKS WITH KEYED CONNECTION

BACKGROUND OF THE INVENTION

1. Field of the Invention

The present invention relates to drum brake shoes and brake lining blocks for vehicles such as trucks or buses.

2. Background Art

Vehicle brakes are generally either disk brakes or drum brakes. Drum brakes are generally preferred for buses and commercial trucks because drum brakes may provide a greater surface area of friction material. The braking surface of the friction material is generally riveted to a backing plate of a brake block. Generally, 12 to 16 rivets are required to attach a brake block to a brake shoe due to the substantial shear forces that must be withstood during braking between the brake blocks and the brake shoe.

Commercial and industrial vehicle brake linings that are riveted to steel brake shoes are generally rigid, non-asbestos friction material. If the outer diameter of the brake shoe surface that is to be retrofit with new brake linings is not completely flat or within original design radius tolerances, the lining after fastening to the shoe may crack or break off of the brake shoe. This may create problems relating to braking performance and durability.

The friction material used on brake blocks is drilled and countersunk to receive rivets that are used to connect the brake block to the brake shoe. Holes are formed in the friction material by either a drilling or a punch operation. If the counter bore is not drilled deep enough, the brake block may crack when riveted to the to the brake shoe by a riveter. If the counter bore is drilled too deep, the brake block may be only loosely fastened that can lead to cracking of the friction material or other problems.

If the rivet tool misses a rivet location and contacts the friction material, may harm the friction material. The friction material may be cracked, broken, or deformed if the rivet is misdirected, or improperly set-up for depth and force. Any cracking, breakage or deformation could adversely impact braking performance of the lined brake shoe when installed on a vehicle.

Substantial labor costs are incurred to rivet brake blocks to a brake shoe. Additional expenses may be incurred if it is necessary to scrap a cracked brake block.

The surface area of the friction material is reduced by each access hole in the friction material required for a rivet. Any reduction in surface area of the friction material may adversely affect stopping performance. Holes for rivets in the surface of the friction material may result in unwanted noise especially if dirt or other foreign material is permitted to collect in the rivet access holes.

It has been proposed to integrally mold rivets into the backing plate of the brake block. Another attaching mechanism proposed for brake blocks is the use of clinch nuts, however, clinch nuts are generally only usable with transit bus brakes due to the high profile of the clinch nuts.

In the manufacture of brake blocks, problems may be encountered including blistering at the corners of the brake blocks. The corners of brake blocks may be broken or damaged especially if the corners are formed with right angle corners.

There is a need for an improved brake shoe having brake blocks that maximize the friction material surface area while minimizing riveting operations. There is also a need to eliminate the potential for damage to friction material on brake blocks when they are assembled to a brake shoe. Applicant's invention is directed to solving the above problems as summarized below.

SUMMARY OF THE INVENTION

According to one aspect of the present invention, a brake shoe assembly is provided that includes a brake shoe and a brake plate. The brake shoe has an outer radial surface. The brake plate is secured to the outer radial surface of the brake shoe. A slot and an integrally formed key are provided between the brake shoe and brake plate. The slot and key prevent radial movement of the brake plate relative to the outer radial surface of the brake shoe. The slot and key also greatly increase resistance to shear forces when the brake is applied when compared to conventional rivet secured brake linings. A plurality of rivets are provided for securing the brake plate to the brake shoe.

According to another aspect of the present invention, a vehicle brake drum shoe assembly is provided that includes a cylindrical brake shoe and at least one brake plate that is secured to the outer radial surface of the brake shoe. A pair of keys are integrally formed by a punching operation in each of the cylindrical brake shoes to extend outwardly from the outer radial surface of the brake shoe. The brake plate is secured to the outer surface of the brake shoe and includes a pair of slots for receiving the keys of the brake shoe. The keys of the brake shoe are received in the slots in the brake plate and function to limit, and prevent, radial movement of the brake plate relative to the outer radial surface of the brake shoe.

Other aspects of the invention relate to preassembling rivets to the brake plate and providing a pair of alignment holes for receiving the preassembled rivets that facilitate alignment of the brake shoe keys with brake plate slots. The preassembled rivets are longer than the height of the brake shoe key to align the brake shoe key with the brake plate slot. The preassembled rivets are secured to the brake shoe by a flaring tool. The friction material of the brake lining is molded over and covers one end of the preassembled rivets. One brake shoe may receive two brake blocks that each have two slots or key ways, wherein four keys are formed on each brake shoe. The keys are formed or pressed out form the inside of the outer surface of the brake shoe without breaking through the brake shoe. The elongated keys, or ribs, fit tightly within the elongated key ways formed in the backing plates.

According to other aspects of the invention relates to forming four recesses at the four corners of the brake plate that expose a corner portion of the brake plate. Rivets are inserted through the four exposed corner portions to join the brake plate and brake shoe after the preassembled rivets align the brake shoe key with the brake plate slot. The brake plate may then be riveted to the brake shoe for providing metal-to-metal contact and eliminating the need to rivet through the friction material. The brake plate slot is axially elongated to receive the elongated brake shoe keys. The backing plates span the friction lining surface and provide additional strength for the brake linings as they are attached to the brake shoe.

According to another aspect of the present invention, a method of manufacturing a brake assembly is provided. The method begins by providing a brake plate having a plurality of rivet apertures and an alignment slot. Four apertures may be provided at four corners of the brake plate with two intermediate apertures being provided at opposite sides of the brake plate. A set of preassembled rivets are inserted into the two intermediate apertures of the brake plate. A frictional brake lining is then molded over the preassembled rivets so that the frictional brake lining covers the preassembled rivets. A brake shoe having a plurality of apertures that match the apertures in the brake plate also further includes a key that protrudes from the outer radial surface of the brake shoe. Each of the brake plate slots receives a brake shoe key when the brake plate is mated to the brake shoe. The preassembled rivets are aligned with corresponding holes in the brake shoe to facilitate inserting the brake shoe key into the brake plate slot. A set of rivets is inserted in each of the rivet apertures in the corners of the brake plate. The rivets extend through corresponding holes in both the brake plate and the brake shoe and are secured by a rivet tool in a riveting operation. The preassembled rivets are flared to secure the brake plate to the brake shoe. The brake shoe key when inserted in the brake plate slot limits, or prevents, movement of the brake plate relative to the outer radial surface of the brake shoe.

According to other aspects of the invention as they relate to the method of manufacturing a brake assembly, the molding step may be performed without applying a brake lining over portions of the four corners of the brake plate. The open corners of the brake plate expose the four corner rivet apertures to facilitate riveting the brake plate to the brake shoe with metal-to-metal contact. This allows the riveting process to be used without drilling and counterboring the friction material for riveting access. The method may also comprise forming the brake slot as an axially elongated aperture and forming the brake shoe key as an axially elongated key, or rib, that fits within the axially elongated brake slot. The method may further comprise forming a pair of axially elongated slots in the brake plate and forming a corresponding pair of axially elongated keys in the brake shoe for each brake plate. The keys may be formed as integrally formed portions of the brake shoe in a punching or stamping operation.

These and other aspects of the present invention will be better understood in view of the attached drawings and following detailed description of the illustrated embodiment.

BRIEF DESCRIPTION OF THE DRAWINGS

FIG. 3 is a cross-section taken along the line 3—3 in FIG. 2;

FIG. 4 is a cross-section taken along the line 4—4 in FIG. 2;

FIG. 5 is a cross-sectional view of a preassembled rivet in a brake plate inserted through a hole in the brake shoe; and FIG. 6 is a cross-sectional view similar to FIG. 4 showing the preassembled rivet flared to secure the brake plate to the brake shoe.

DETAILED DESCRIPTION OF THE PREFERRED EMBODIMENT(S)

Figure 1:
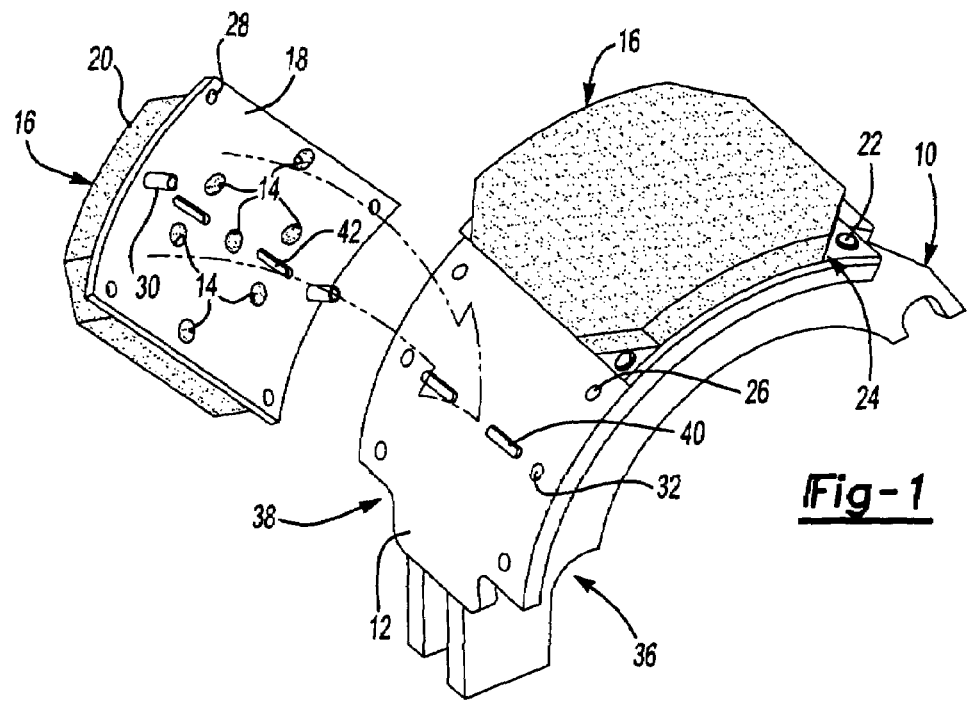
FIG. 1 is an exploded perspective view of a brake shoe with one brake plate secured to the brake shoe and a second brake plate shown prior to assembly to the brake shoe.

Referring to FIG. 1, a brake shoe 10 having a cylindrical outer surface 12 is illustrated with one brake plate 16 assembled to the cylindrical outer surface 12 and a second brake plate 16 that is shown unattached to the brake shoe 10. Each of the brake plates 16 includes a backing plate 18 to which is bonded a layer of friction material 20. A plurality of apertures 14 are provided in the backing plate 18 into which friction material 20 is integrally molded to mechanically attach the friction material 20 to the backing plate 18.

The brake plates 16 are attached, in part, by rivets 22 that are secured to the backing plate 18 at open corners 24. The open corners 24 are areas where no friction material 20 is bonded to the backing plate 18. Alternatively, the layer of friction material 20 could be applied over the entire backing plate 18 and then subsequently removed by cutting away or milling the friction material to create the open corners 24. Holes 26 for receiving the rivets 22 are formed in the brake shoe 10 at spaced locations corresponding to the spacing of the rivets 22. The brake plates 16 are riveted by the rivets 22 through holes 28 in the backing plate 18 directly to the outer surface 12 of the brake shoe 10 to create a rivet connection that has metal-to-metal contact.

Preassembled rivets 30 extend from each of the backing plates 18. The preassembled rivets 30 are received in holes 32 formed in the outer surface 12 of the brake shoe 10. The preassembled rivets 30 are secured to mounting holes 34, the backing plates 18 and a layer of friction material 20 is molded onto the backing plate 18 covering one end of the preassembled rivets 30. The rivets 22 and preassembled rivets 30 are arranged in rows, as shown, on the inboard side 36 and outboard side 38 of the brake shoe 10. The preassembled rivets 30 are arcuately spaced from the rivets 22 that are inserted through holes 28 in the open corners 24 of the brake plate 16.

Keys 40 are formed in the brake shoe 10 to extend outwardly from the cylindrical outer surface 12. The keys 40 are preferably elongated in shape and extend lengthwise in an axial direction. Two keys 40 may be arranged, as shown, in axial alignment on the outer surface 12 of the brake shoe 10. The keys 40 are received in slots 42 formed in the backing plate 18 of the brake plates 16. The integrally formed keys 40 when received in the slots 42 provide a positive and effective part of the attachment system that can withstand substantial shear forces that are created when the brake shoe engages a brake drum (not shown) to stop a vehicle (not shown).

Figure 2:
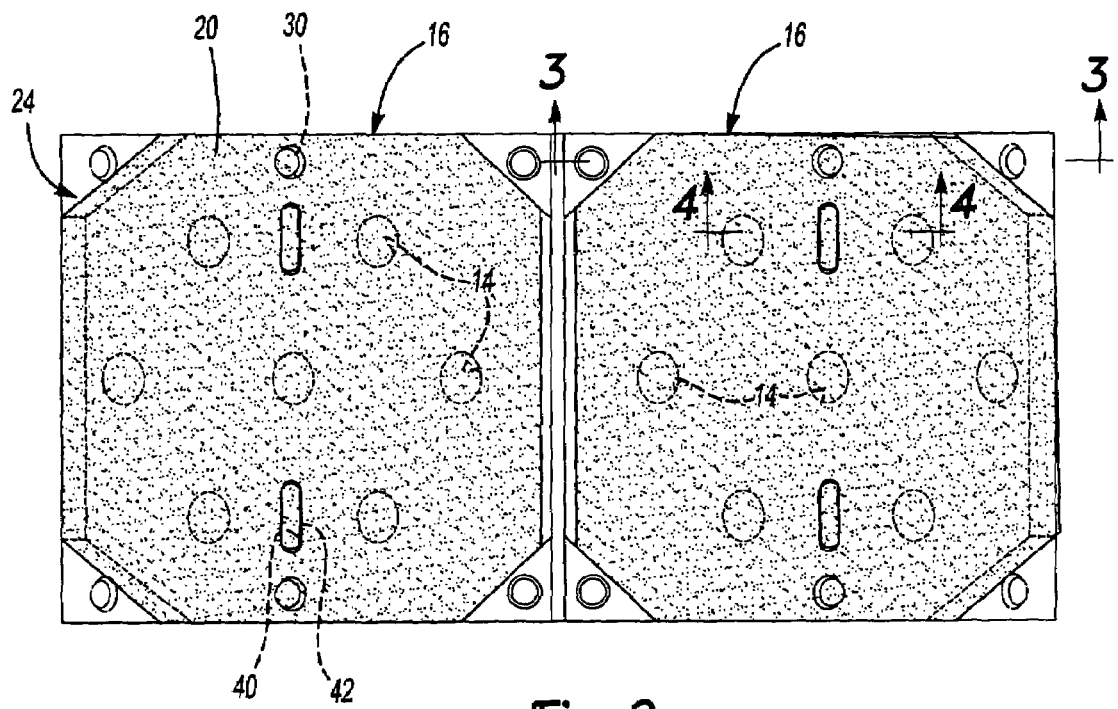
FIG. 2 is an elevation view of a brake shoe and two brake plates.

Referring to FIG. 2, the construction of the brake plates is shown in greater detail. Each brake plate 16 has a backing plate 18 onto which a layer of friction material 20 is bonded. The open corners 24 of each brake plate 16 each reveal a part of the backing plate 18. A layer of friction material 20 is molded over the preassembled rivets 30 to provide a continuous layer of friction material 20 that is not interrupted by a plurality of riveting holes as was provided with conventional brake plates. The preassembled rivets 30, as illustrated, may be axially aligned with the keys 40 and slots 42.

Referring to FIG. 3, connection of the brake plates 16 to the brake shoe 10 by means of the rivets 22 and preassembled rivets 30 is shown. Rivets 22 are flared in a riveting operation after insertion through the rivet receiving holes 26 and holes 28 formed in backing plates 18. The preassembled rivets 30 are assembled to the backing plate 18 before the layer of friction material 20 is applied to the backing plate 18. After the brake plate 16 is assembled to the brake shoe 10, a flaring tool is used to flare the end of the preassembled rivets 30 forming a rivet-like connection between the brake plate 16 and brake shoe 10.

Referring to FIG. 4, a cross section of the connection between the key 40 of the brake shoe 10 and slot 42 in the backing plate 18 of the brake plate 16 is shown. The key 40 may be formed by a sheet metal forming process wherein a punch engages the brake shoe 10 to force the key 40 to extend outwardly from the outer surface 12 of the brake shoe 10 without separating the key 40 from the brake shoe 10.

Referring to FIG. 5, one of the preassembled rivets 30 is shown inserted into one of the alignment pin holes 32. The preassembled rivets 30 orient the slots 42 relative to the keys 40 and also align the rivet receiving holes 26 on the brake shoe 10 with the holes 28 formed in the open corners 24 of the backing plate 18. As shown in FIG. 6, the alignment pin 30 has been flared by a flaring tool to firmly secure the backing plate 16 to the brake shoe 10.

The method of manufacturing the brake shoe 10 having replaceable brake plates 16 is described below. The method begins by providing a brake plate 16 having a plurality of apertures for receiving rivets and at least one slot 42 for receiving a key 40. Four rivet receiving apertures or holes are provided at the four corners of the backing plate 18 of the brake plate 16. Two preassembled rivets 30 are inserted into holes 32 in the backing plate 18 between the rivet receiving holes 26. A layer of friction material 20 is then molded over the preassembled rivets 30 so that the friction brake lining 20 covers the outer ends of the preassembled rivets 30. The brake shoe 10 has rivet holes 26 that are provided to receive rivets 22 and holes 32 for receiving the preassembled rivets 30. The brake plates 16 have slots 42 for receiving a brake shoe key 40 when the brake plate 16 is mated to the brake shoe 10. Preassembled rivets 30 are used to align the brake plate 16 with the brake shoe 10 and facilitate insertion of the brake shoe key 40 into the slots 42. Rivets 22 are inserted into each of the rivet apertures in the four open corners 24 of the brake plate 16. The rivets 22 extend through corresponding holes 26 and 28 in the brake shoe 10 and brake plate 16, respectively. The rivets 22 are riveted at the open corners 24 by a riveting tool. The preassembled rivets 30 are flared to secure the brake plate 16 to the brake shoe 10 at a point generally axially aligned with keys 40 and slots 42. The preassembled rivets 30 could alternatively be offset from the keys 40 and slots 42. The brake shoe key 40 is inserted in the slot 42 to prevent radial movement of the brake plate 16 relative to the outer radial surface 12 of the brake shoe 10.

The method of assembling brake plate 16 to a brake shoe 10 described above simplifies the manufacture of brake shoes by reducing the number of rivets required to secure the brake plate 16 to the brake shoe 10. It also eliminates boring and counter boring rivet holes in the friction material. Preassembled rivets 30 align the keys 40 with the slots 42 while at the same time aligning the holes 28 in the backing plate 18 with the rivet receiving holes 26 in the brake shoe 10. Metal-to-metal contact is provided for the rivets 22 to secure the brake plate 16 to the brake shoe 10. The open corners 24 provide clearance between the rivet locations and the friction material 20 so that the riveting operation will not crack the layer of friction material 20.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A brake shoe assembly comprising:
    a brake shoe having an outer radial surface and a plurality of holes;
    a brake plate secured to the outer radial surface of the brake shoe, the brake plate having a backing plate that supports a brake lining;
    a slot formed on the backing plate and a key provided on the brake shoe, the slot and key being disposed adjacent to each other when the backing plate is disposed proximate the brake shoe and cooperating to resist movement of the brake plate relative to the outer radial surface; and
    a plurality of fasteners for securing the brake plate to the brake shoe;
    wherein the plurality of fasteners includes a preassembled fastener preassembled to and extending away from the brake plate toward the brake shoe, the preassembled fastener being disposed in a corresponding member of the plurality of holes to facilitate alignment of the key within the slot, and wherein the balance of the plurality of fasteners are disposed in the brake plate and the brake shoe when the preassembled fastener aligns the key with the slot.

2. The brake shoe assembly of claim 1 wherein the plurality of fasteners are rivets.

3. The brake shoe assembly of claim 1 wherein the preassembled fastener is longer than the key to facilitate aligning the key relative to the slot prior to the slot receiving the key.

4. The brake shoe assembly of claim 1 wherein the preassembled fastener is secured to the brake shoe by a flaring tool.

5. The brake shoe assembly of claim 1 further comprising a friction material brake lining molded over and covering the preassembled fastener.

6. A method for manufacturing a brake assembly, the method comprising:
    providing a brake plate having a plurality of fastener apertures and an alignment slot, wherein the plurality of fastener apertures includes corner fastener apertures provided at four corners of the brake plate and two of the fastener apertures are intermediate fastener apertures provided on opposite sides of the brake plate;
    inserting a set of preassembled fasteners into the two intermediate fastener apertures of the brake plate;
    molding a friction material brake lining over the set of preassembled fasteners, the friction material brake lining covering the set of preassembled fasteners;
    providing a brake shoe having a plurality of holes corresponding to the location of the plurality of fastener apertures of the brake plate, the brake shoe further including a key protruding from an outer radial surface;
    mating the alignment slot with the key by aligning the preassembled fasteners with corresponding holes in the brake shoe prior to the alignment slot receiving the key;
    inserting a fastener in each of the corner fastener apertures, the fasteners extending through corresponding holes in the brake shoe and corner fastener apertures in the brake plate; and
    securing the brake plate by fastening the fasteners and the preassembled fasteners to the brake shoe with the slot receiving the alignment key to resist radial movement of the brake plate relative to the outer radial surface of the brake shoe.

7. The method of claim 6 wherein the molding step comprises molding the friction material brake lining on the brake plate while preventing application of the brake lining over portions of the four corners of the brake plate, wherein each corner of the brake plate includes one of the corner fastener apertures.

8. The method of claim 6 wherein providing the brake plate comprises forming the slot as an axially elongated aperture and forming the alignment key as an axially elongated rib to fit within the axially elongated aperture.

9. The method of claim 6 further comprising forming a pair of axially elongated slots in the brake plate and forming a corresponding pair of axially elongated keys on the brake shoe.

10. The method of claim 6 wherein providing the brake shoe further comprises forming the alignment key as an integrally formed portion of the brake shoe.

* * * * *